United States Patent
Muterspaugh

(10) Patent No.: US 8,401,482 B2
(45) Date of Patent: Mar. 19, 2013

(54) APPARATUS AND METHOD FOR CONTROLLING A SIGNAL

(75) Inventor: Max Ward Muterspaugh, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 997 days.

(21) Appl. No.: 12/084,615

(22) PCT Filed: Oct. 25, 2006

(86) PCT No.: PCT/US2006/041643
§ 371 (c)(1),
(2), (4) Date: May 5, 2008

(87) PCT Pub. No.: WO2007/055910
PCT Pub. Date: May 18, 2007

(65) Prior Publication Data
US 2010/0216414 A1 Aug. 26, 2010

Related U.S. Application Data
(60) Provisional application No. 60/734,208, filed on Nov. 7, 2005.

(51) Int. Cl.
*H04B 1/00* (2006.01)
*H04B 15/00* (2006.01)
*H04M 1/00* (2006.01)
(52) U.S. Cl. .................... 455/63.4; 455/562.1
(58) Field of Classification Search ............. 455/63.1, 455/63.4, 562.1
See application file for complete search history.

(56) References Cited

U.S. PATENT DOCUMENTS

| | | | |
|---|---|---|---|
| 5,444,762 A | 8/1995 | Frey et al. | |
| 6,512,917 B1 * | 1/2003 | Hiramatsu | 455/69 |
| 8,032,086 B2 * | 10/2011 | Waltho et al. | 455/63.1 |
| 2005/0153703 A1 * | 7/2005 | Juntti et al. | 455/452.2 |
| 2005/0227658 A1 * | 10/2005 | Saliga et al. | 455/272 |
| 2007/0191068 A1 * | 8/2007 | Ochi et al. | 455/562.1 |
| 2009/0042614 A1 * | 2/2009 | Karaoguz et al. | 455/561 |
| 2009/0303935 A1 * | 12/2009 | Ozluturk | 370/328 |

FOREIGN PATENT DOCUMENTS

| | | |
|---|---|---|
| CN | 1486522 | 3/2004 |
| JP | 001103002 | 4/2001 |
| JP | 2005117166 | 4/2005 |
| JP | 2005167569 | 6/2005 |
| WO | WO 98/11679 A | 3/1998 |
| WO | WO 98/39856 A | 9/1998 |
| WO | WO 99/41803 A | 8/1999 |

OTHER PUBLICATIONS

Search Report Dated Jan. 24. 2007.

* cited by examiner

*Primary Examiner* — Nguyen Vo
(74) *Attorney, Agent, or Firm* — Robert D. Shedd; Vincent E. Duffy; Michael A. Pugel

(57) ABSTRACT

The disclosed embodiments relate to an apparatus and method for controlling transmission of a signal in a communications device in order to prevent interference. An apparatus is described that includes a transmitter for transmitting a signal, an antenna coupled to the transmitter for radiating the signal in a radiated polarization pattern, and a controller for adjusting the transmitter when the radiated signal exhibits an undesired polarization pattern. A method is also described that includes the steps of producing a signal for transmission, radiating the signal in a polarization pattern, and adjusting the production of the signal for transmission when the radiated signal exhibits an undesired polarization.

14 Claims, 6 Drawing Sheets

APPARATUS AND METHOD FOR CONTROLLING A SIGNAL

This application claims the benefit under 35 U.S.C. §365 of International Application PCT/US2006/041643, filed Oct. 25, 2006, which was published in accordance with PCT article 21(2) on May 18, 2007, in English and which claims the benefit under 35 U.S.C. §119 of a provisional application 60/734,208 filed in the United States on Nov. 7, 2005.

FIELD OF THE INVENTION

The present disclosure generally relates to communications systems and, more particularly, to wireless systems including terrestrial broadcast, cellular, Wireless-Fidelity (Wi-Fi), and satellite communications.

BACKGROUND OF THE INVENTION

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the United States, the TV spectrum currently comprises Advanced Television Systems Committee (ATSC) broadcast signals that co-exist with National Television Systems Committee (NTSC) broadcast signals. The ATSC broadcast signals are also referred to as digital TV (DTV) signals. NTSC transmission is planned to cease in 2009 and, at that time, the TV spectrum will comprise only ATSC broadcast signals. However, and as was the case when only NTSC broadcast signals existed, in any given region of the country, significant TV spectrum goes unused in order to prevent interference between broadcast channels.

Recently, Government agencies and business have suggested that different services could, in the future, share frequency bands such as the broadcast TV spectrum. Various standards bodies have proposed a new wireless radio service known as a wireless regional area network (WRAN) that would share the TV spectrum currently used by terrestrial television broadcasting. One such proposed WRAN system is intended to make use of unused broadcast channels in the TV spectrum, on a non-interfering basis. The primary objective of the proposed WRAN system is to address broadband access in rural and remote areas and low population density underserved markets and provide performance levels similar to those of broadband access technologies serving urban and suburban areas. In addition, the proposed WRAN system may also be able to scale to serve denser population areas where spectrum is available.

In order for the WRAN system and the currently present broadcast signals to share the spectrum, interference between the two systems must be mitigated. It has been proposed that one way to control interference would by to ensure that in some instances the two services have orthogonal polarization of their respective signal radiation patterns. In the United States, broadcast TV signals are generally transmitted using horizontal polarization. A WRAN system seeking to operate in or around a broadcast channel used by a local broadcast station could be required to transmit using vertical polarization to minimize interference.

In order for WRAN devices, such as base stations and home premises equipment, to accomplish transmission using a particular (e.g. vertical) radiation polarization pattern, the antenna used by the WRAN device may require accurate alignment. One such measure of alignment may be to determine the amount of cross polarizations isolation between, for instance, the vertical or horizontal radiation patterns.

For example, a cross polarization isolation figure given as 14 dB may be used as a measure of correct alignment for proper radiation polarization and may be acceptable to ensure minimal interference between services.

One possible method of achieving the high level of cross-polarization isolation necessary to assure the desired radiation polarization of the antenna used with the WRAN device would be to install the antenna used by the WRAN device using a skilled or professional installer. The antenna could include a reference member that could be adjusted with a level or plumb bob or some electrical measurement device in order to attain a particular radiation pattern orientation. The adjustment and alignment of the antenna would be performed prior to permitting transmission by the WRAN device. Skilled or professional adjustment would then assure proper alignment of the radiating elements to produce the desired cross-polarization and therefore assure the desired radiation polarization.

However, professional installation of the antenna used with a WRAN device may prove unnecessarily expensive. Additionally any adjustment of the antenna after the initial adjustment, due to environmental or other conditions would likely require the installer to return. Furthermore, if the antenna becomes misadjusted and is not radiating in the proper polarization orientation, unnecessary and undesirable interference with broadcast signals may result. It is therefore desirable to have an antenna system that can attain proper radiation pattern and to allow transmission of a wireless radio service such as the WRAN service only when it has been properly aligned to minimize interference to the shared broadcast service.

SUMMARY OF THE INVENTION

The disclosed embodiments relate to an apparatus and method for controlling transmission of a signal in a communications device. In one embodiment an apparatus is described that includes a transmitter for transmitting a signal, an antenna coupled to the transmitter for radiating the signal in a radiated polarization pattern, and a controller for adjusting the transmitter when the radiated signal exhibits an undesired polarization pattern.

In a second embodiment a method is described that includes the steps of producing a signal for transmission, radiating the signal in a polarization pattern, and adjusting the production of the signal for transmission when the radiated signal exhibits an undesired polarization.

The characteristics and advantages of the present disclosure may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a system and circuits used for transmitting and receiving signals in a WRAN. Other systems and circuits utilized to transmit and receive other types of signals in other networks may include very similar structures.

Those of ordinary skill in the art will appreciate that the embodiment of the circuits described herein is merely one potential embodiment. As such, in alternate embodiments, the components of the system may be rearranged or omitted, or additional components may be added based on particular attributes of the system. For example, with minor modifications, the circuits described may be configured for use in other wireless networks such as IEEE 802.11.

Figure 1:
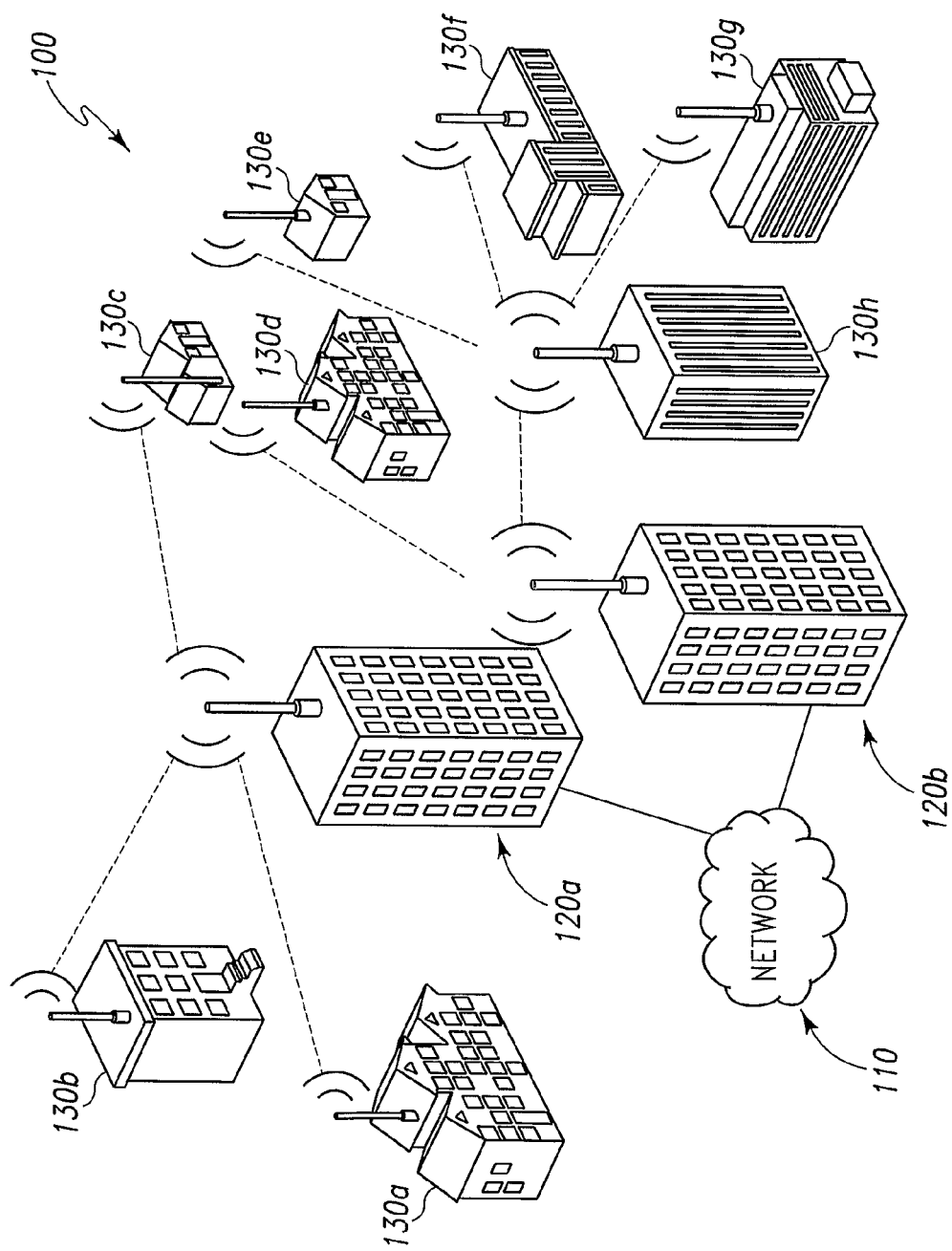
FIG. 1 is a block diagram of an exemplary WRAN.

Turning now to the drawings and referring initially to FIG. 1, a block diagram 100 of an exemplary WRAN is shown. A network 110, such as an internet network provided by an internet service provider, is physically interfaced with base stations 120a and 120b shown within buildings. Each of the base stations 120a and 120b typically contain circuitry for interfacing between network 110 and other devices used in the WRAN. Each of the base stations 120a and 120b may also include equipment placed within the building and may also include an antenna placed on top of the building for providing a wireless or radio interface to other devices used in the WRAN.

Each of the base stations 120a and 120b communicates through the wireless or radio interface to one or more customer premises equipment (CPE) devices 130a-h located within various structures within a region of geographic vicinity of the base stations 120a and 120b. The structures containing the CPE devices 130a-h may be at fixed locations, such as houses or apartment buildings or may be mobile, such as cars, not shown. In a preferred embodiment the regions of geographic vicinity between base stations 120a and 120b and CPE devices 130a-h are segregated into cells based on boundaries governed by radio signal characteristics and terrain. Additionally one or more of the CPE devices 130a-h, may be capable of communicating with base stations 120a and 120b and also with other CPE devices 130a-h.

For example, CPE device 130h may be capable of communicating with both base station 120b as well as CPE devices 130e, f, and g, as shown. In this manner, CPE device 130h may be known as a repeater device in the WRAN.

Figure 2:
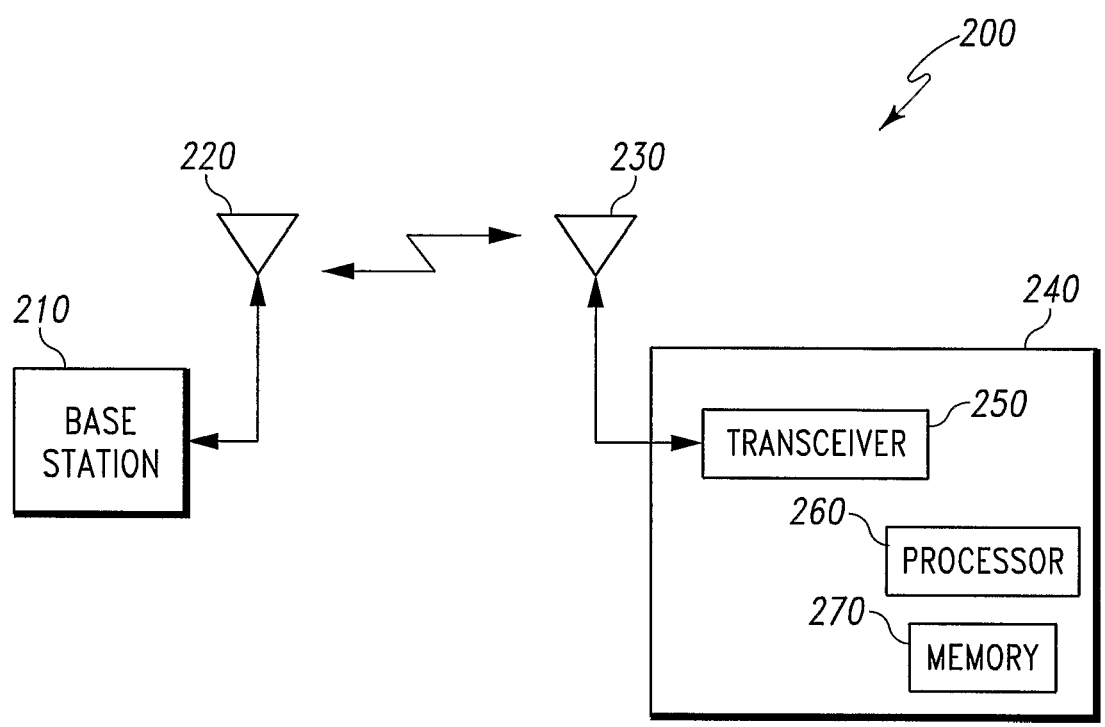
FIG. 2 is a block diagram of an exemplary system used in a WRAN.

Turning to FIG. 2, a block diagram of an exemplary system 200 used in a WRAN is shown. The block diagram shown is shown in a simplified form without interconnections. Several blocks in the exemplary system 200 will have circuitry located within the blocks not shown but further described below. As shown in FIG. 1, a WRAN system contains at least one base station 210 capable of serving a geographical area (the WRAN area). Base station 210 may contain circuitry for processing and converting information and content received from a network through a network interface. Base station 210 may also contain a transceiver circuit for transmitting and receiving information using the WRAN. The base station 210 communicates over the WRAN to a CPE 240 through antennas 220 and 230 attached to base station 210 and CPE 240 respectively. In one embodiment, the physical layer protocol of communication between base station 210 and CPE 240 is based on orthogonal frequency division multiplexing (OFDM) using a packet based data structure.

CPE 240 includes one or more processors and associated memory as represented by processor 260 and memory 270. In this context, computer programs, or software, are stored in memory 270 for execution by processor 260. Processor 260 may also control other functions of CPE 240. Memory 270 is representative of any storage device, e.g., random-access memory (RAM), read-only memory (ROM), etc. and may be internal or external to CPE 240. Memory 270 may be volatile or non-volatile as necessary. CPE 240 also contains a transceiver 250 for receiving and transmitting information over the WRAN using antenna 230.

Transceiver 250 may communicate information received or transmitted over the WRAN directly with processor 260 or may communicate with signal processor. Transceiver 250 will be described in more detail below. CPE 240 may additionally contain user interface components such as a keyboard and display screen for direct interaction with users. Alternately, CPE 240 may provide an indirect interface such as universal serial bus (USB) for interfacing to external devices such as home computers or televisions.

To enter a WRAN network, CPE 240 may first "associate" with base station 210. During this association, CPE 240 transmits information via transceiver 250 and antenna 230 containing the capability of CPE 240 to base station 210 using a control channel set up in the communications protocol. The reported capability includes, for instance, minimum and maximum transmission power, and a supported channel list for transmission and receiving. Base station 210, through antenna 220, may also communicate back to CPE 240 via the same control channel or through an alternate channel regarding operating requirements for a data communication channel and capabilities of the WRAN. The capabilities and requirements from the base station 210 may also include additional information such as the required polarization orientation for the antenna 230 for proper operation on the data communication channel or the polarization orientation of any local TV channels. CPE 240 may additionally perform operations to determine the signal environment such as determining which local TV channels are present. The resulting information about the signal environment may then be provided to base station 210 in order to modify or augment the supported channel list for use in WRAN communications.

As noted earlier, a WRAN system makes use of unused television (TV) broadcast channels in the TV spectrum and shares the spectrum on a secondary use basis.

In this regard, the WRAN system defers to the operation of local broadcast stations in order to avoid interference with their operation. As a result, CPE 240 may include the capability to determine the presence of local broadcast stations by, for instance, detecting signal energy. In addition, CPE 240 includes the capability to avoid interference with the local broadcast station using components and techniques as will be described further herein.

Figure 3:
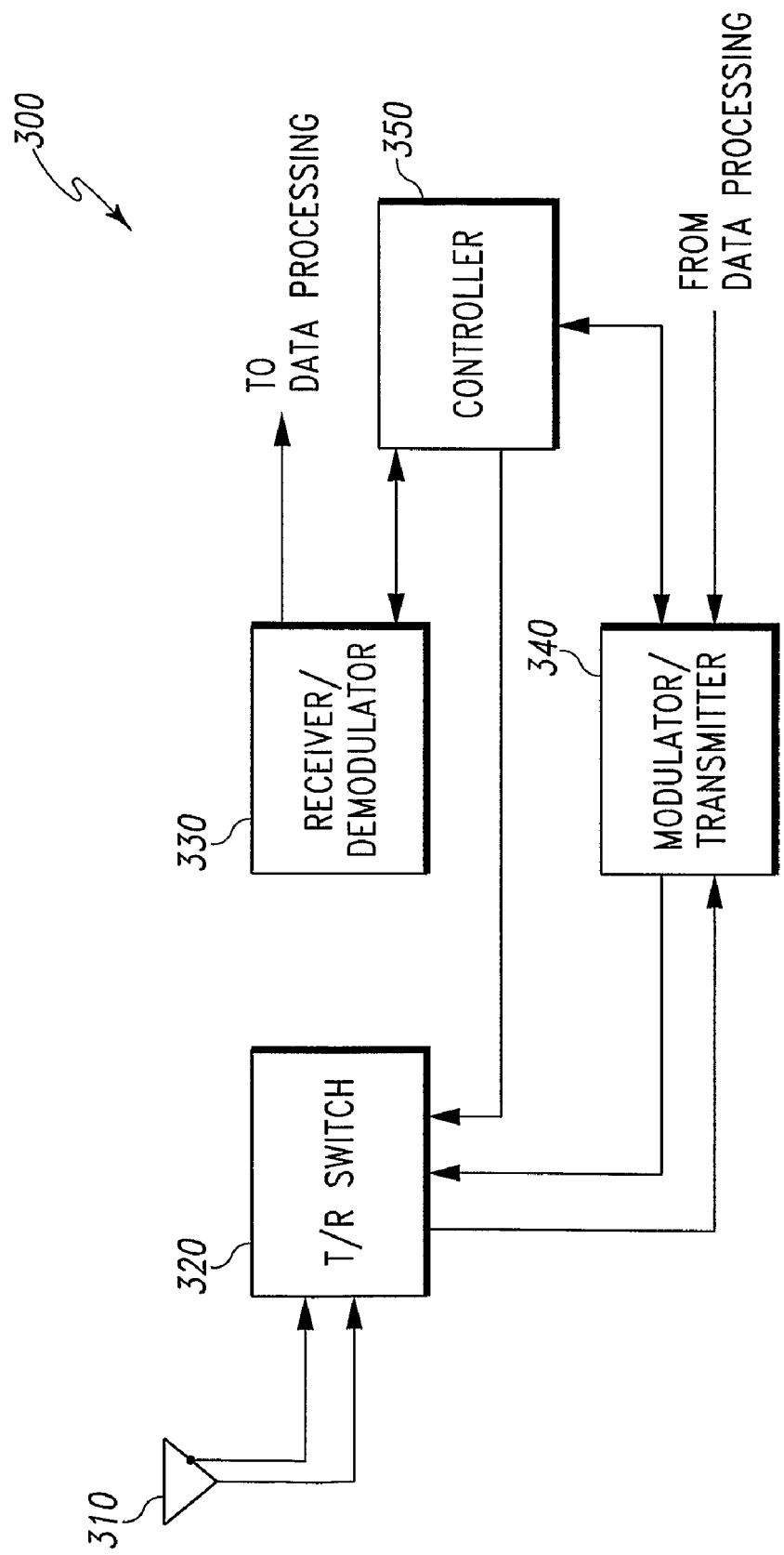
FIG. 3 is a block diagram of an embodiment of a transceiver using an embodiment of the present invention.

Turning to FIG. 3, a block diagram 300 of an embodiment of a transceiver using an embodiment of the present invention is shown. Although a transceiver circuit as found in a CPE 240 is described below, the transceiver circuit found in a base station 210 may be similar or identical in description and circuitry. Additionally, the blocks described represent a logical functional separation. The blocks may be maintained as separate physical elements or may be combined into larger submodules. The blocks may also be incorporated into one or more integrated circuits.

Antenna 310 provides the physical layer medium interface for communicating with the base station or other CPE using a radio wave propagation signal. Antenna 310 has a connection for bidirectionally interfacing the propagated radio wave signal as an electrical signal to the transmit/receive (T/R) switch 320. T/R switch 320 has preferably two switch states that control whether a signal is directed to antenna 310 or directed from antenna 310. T/R switch 320 is typically a single pole double throw (SPDT) type switch and may be built using a number of electrical circuit arrangements and components such as diodes, transistors, or gates as is well known to those skilled in the art.

When T/R switch 320 is switched to a receive state, the radio wave propagated signal received by antenna 310 is directed through T/R switch 320 and provided to receiver/demodulator 330 connected to T/R switch 320.

Receiver/demodulator 330 contains circuits for amplifying, frequency converting, filtering, and demodulating the received signal. In a preferred embodiment, the receiver/demodulator 330 processes the received signal by first amplifying and filtering the received signal. The receiver/demodulator 330 may also convert the received signal from its received frequency to a second frequency better permitting signal demodulation. The receiver/demodulator 330 may also demodulate the received signal after the signal is amplified, filtered, and converted, in accordance with a signal standard. In a preferred embodiment the demodulator is capable of OFDM demodulation in accordance with the signal standard used in the WRAN. The output signal, representing a digital data stream, is provided for further processing in circuitry such as a data signal processor, not shown.

When T/R switch 320 is switched to the transmit state, antenna 310 is connected through T/R switch 320 to modulator/transmitter 340. Modulator/transmitter 340 contains circuitry for interfacing an input data signal to a modulator, and may also contain circuits such as amplifiers, filters, mixer, and oscillators. Modulator/transmitter 340 receives an input digital data signal from a signal processing circuit such as a data signal processor, not shown. The modulator/transmitter 340 modulates the input digital data signal to generate a modulated signal. In a preferred embodiment, modulator/transmitter 340 modulates the input digital data signal to form an OFDM signal in accordance with the signal standard used for the WRAN. The modulator/transmitter 340 may also frequency convert the modulated signal to a frequency suitable for eventual transmission as a propagated radio wave signal at antenna 310. The modulator/transmitter 340 may also filter and amplify the converted signal in order to further condition and prepare the signal for transmission. The output transmission signal from modulator/transmitter 340 is provided to the T/R switch 320.

The T/R switch 320, switched to transmit state, provides the transmission signal to the antenna 310 for propagation.

Antenna 310 may also provide an antenna transmit control signal. In a preferred embodiment, the antenna transmit control signal may be generated based on the particular orientation of antenna 310. A particular orientation of antenna 310 may physically produce a particular radiation pattern of propagation such as a particular polarization of the radiation pattern. Generating and maintaining proper polarization of the radiation pattern can result in the elimination or reduction of unwanted signal interference between two services sharing a common spectrum of frequencies. When antenna 310 is not producing the proper radiation polaration due to improper antenna orientation, an error condition with antenna 310 may exist. The error condition is used by antenna 310 to generate the antenna transmit control signal, as will be described in more detail below.

The antenna transmit control signal from antenna 310 connects to the T/R switch 320 and may act to alter the operation of T/R switch 320. In a preferred embodiment, antenna transmit control signal may prevent the T/R switch from switching to the transmit state when an error condition with antenna 310 is detected.

A controller 350 connects to T/R switch 320, receiver/demodulator 330, and modulator/transmitter 340. The controller 350 provides control signals for operating or tuning the frequency conversion circuitry in either the receiver/demodulator 330 or modulator/transmitter 340. Controller 350 may also control the operation of the demodulator in receiver/demodulator 330 and modulator in modulator/transmitter 340, allowing changes for different signal standards including signal bandwidth, error correction, or signal formats.

Controller 350 may also receive signals from the receiver/demodulator 330 and modulator/transmitter 340 indicating status or error conditions, or may receive commands to pass on to other circuits. Controller 350 also controls the switch state during normal operation of T/R switch 320. Control of the T/R switch 320 may be controlled by commands passed to the controller 350, or may be initiated by the controller 350 based on controlling other blocks. As described above, an error condition may allow the antenna transmit control signal from antenna 310 to override control of T/R switch 320 by controller 350. Controller 350 may be a separate component or may be incorporated in the signal processing circuitry, not shown, or further may be incorporated into a larger processor used for entire CPE, as shown in FIG. 2.

Figure 4:
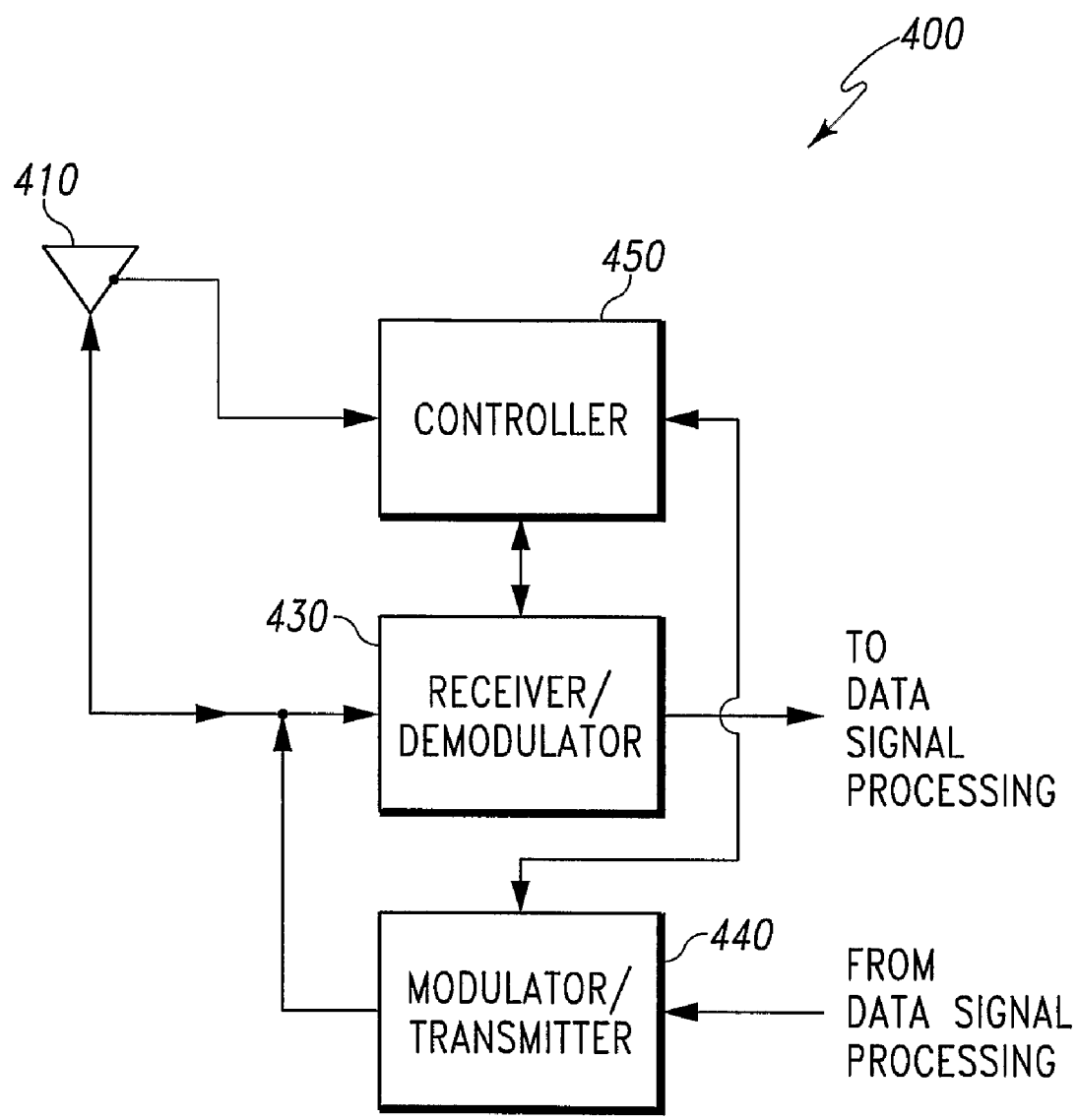
FIG. 4 a block diagram 400 of another embodiment of a transceiver using an embodiment of the present invention is shown.

Turning to FIG. 4, a block diagram 400 of another embodiment of a transceiver using an embodiment of the present invention is shown. Antenna 410, receiver/demodulator 430, and modulator/transmitter 440, and controller 450 have functions similar to those described in FIG. 3 previously and will not be further described here. In FIG. 4, antenna 410 connects directly to receiver/demodulator 430 and modulator/transmitter 440. The direct connection is more common in transceiver systems employing either half duplex or full duplex communications as opposed to the simplex communications based transceiver described above. The antenna transmit control signal from antenna 410 is provided to controller 450. Controller 450 may provide transmission enable and disable control directly to modulator/transmitter 440.

Controller 450 may also adjust the transmission signal power or signal level of modulator/transmitter 440. Transmission signal power adjustment may be accomplished within modulator/transmitter 440 using a number of known techniques including incorporating an attenuator circuit or adjusting the signal gain of one or more transmitter amplifiers. In this manner, the transceiver may continue to transmit but in a reduced power condition. The reduce power condition may be determined based on signal conditions of a local broadcast station in a way that interference either remains non-existent or is minimized to an acceptable level.

It should be noted that although the systems described utilize a common antenna to transmit and receive signals during communication with a base station or other CPE device, separate antennas for transmitting and receiving may be used. In an arrangement employing separate antennas, the transmitting antenna would generate the antenna transmit control signal. The antenna transmit control signal may then be provided to a controller or may also be provided to the modulator/transmitter block and would implement the same operation function as described previously.

It should also be noted that transmitter control based on antenna orientation may be accomplished using an alternative system that may employ a control signal supplied by a different element other than an antenna. For instance, a mobile or handheld device may include a transceiver and antenna that maintains a static mechanical relationship between the enclosure for the handheld device and the antenna. A transmitter control switch may be included as part of the enclosure rather than as part of the antenna, still allowing a similar function resulting in antenna transmitter control based on antenna orientation.

Figure 5A:
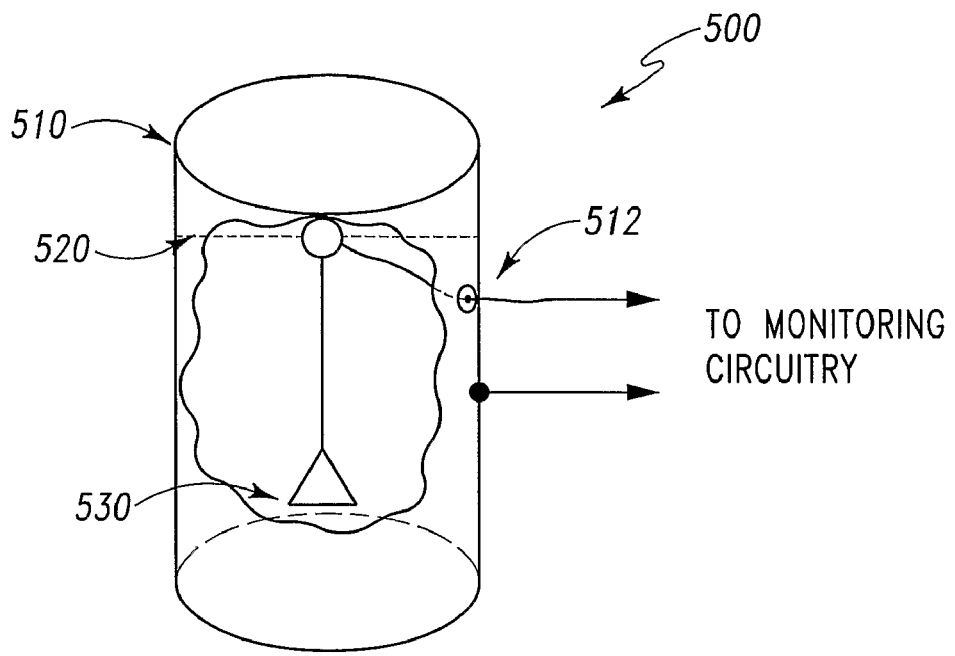
FIG. 5*a* is a diagram of an embodiment of a transmitter control switch using an embodiment of the present invention in a first orientation.
Figure 5B:
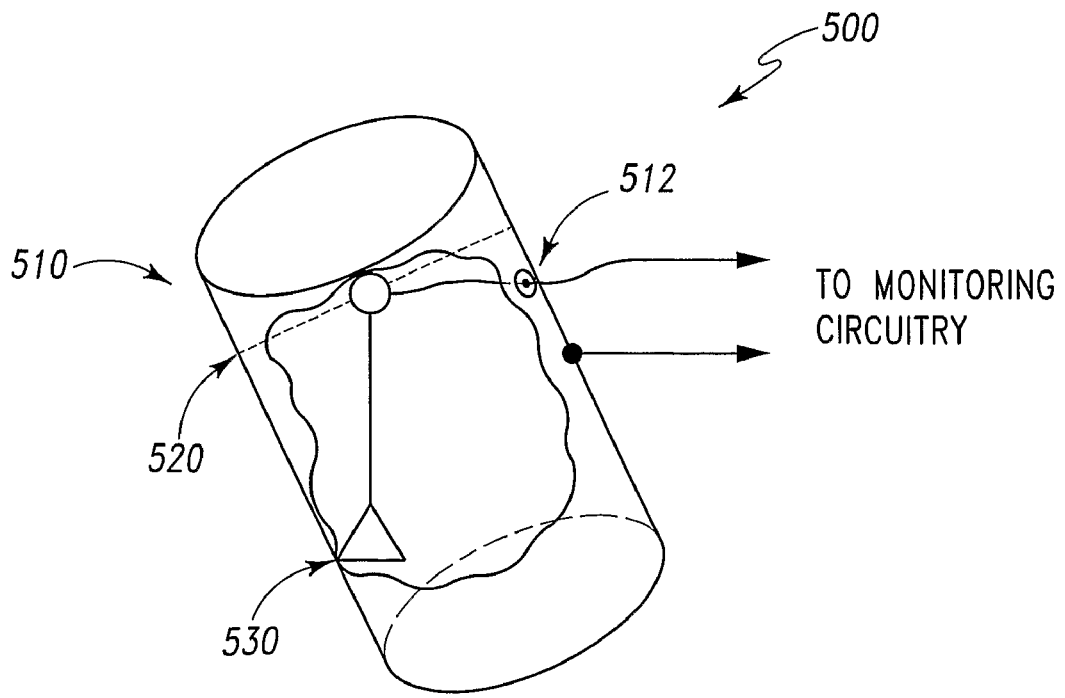
FIG. 5b is a diagram of an embodiment of a transmitter control switch using an embodiment of the present invention in a second orientation.

Turning to FIG. 5a and FIG. 5b, a diagram 500 of an embodiment of a transmitter control switch using an embodiment of the present invention is shown in two different orientations. The diagram shows a position sensitive switch that may be included as part of an antenna and antenna mounting structure, such as antenna 310 described previously. A conductive tube 510 has a connecting wire attached to an outer surface for connecting to monitoring circuitry, not shown.

The conductive tube 510 may be a part of the actual antenna, such as a segment of a dipole radiating element, or may be separately attached to the antenna or mounting structure as a non-radiating structure. In a preferred embodiment, the conductive tube 510 is part of the mounting base of the antenna structure.

An insulating support 520 is attached inside the conductive tube 510. A conductive weight 530 is suspended from the insulating support 520 using a conducting wire attached to the insulating support 520. The conducting wire, after attaching to the insulating support 520, exits the interior of conducting tube 510 through insulated hole 512. The conducting wire, like the connecting wire attached to the conductive tube 510, may be connected to monitoring circuitry. The connecting wire connected to the conductive tube 510 and the conducting wire form the circuit for generating the antenna transmitter control signal described previously. The monitoring circuitry, not shown, may include a circuit included in a T/R switch as described previously or may be part of a larger controller incorporated within a transceiver used for the WRAN, also as described previously.

The conductive weight 530 may move or rotate freely while suspended by the conducting wire from the insulating support 520 in response to a change in orientation of conductive tube 510. For example, the conductive weight 530 and conducting wire may maintain an orientation in a vertical axis while only under the influence of gravity. The conductive tube 510 in FIG. 5A is shown in a vertical orientation. The conductive weight 530 is not in contact with the sides of the conductive tube 510 therefore not completing the circuit between the connecting wire and the conductive wire. FIG. 5b shows the conductive tube 510 in a rotated orientation such that the conductive tube 510 is no longer vertically oriented. The conductive weight 530 contacts the inner surface of the side of the conductive tube 510.

The conductive weight 530 contacting the side of the conductive tube 510 completes or closes the circuit between the conducting wire and the connecting wire. The presence of this closed circuit may be detected by the monitoring circuitry.

The change of states between an open and closed circuit in the antenna transmitter control provides an indicator improper antenna orientation. The state change may be used to prevent transmitter operation in the transceiver. Alternately the state change may also be used to control or reduce the transmitter power. Also, the state change may be used to indicate that service is needed. For instance, a service provider may be notified that service is needed and that the antenna is or has become misaligned and may require service.

The length of the pendulum formed by the conductive weight 530 and the conductive wire in conjunction with the inner diameter of the conductive tube 510 may determine the amount of misalignment or misorientation of the antenna structure before the conductive weight 530 and conductive tube 510 make contact. The pendulum may for instance, be designed to allow no more than 10 degrees of misalignment from the proper antenna orientation before the conductive weight 530 contacts the conductive tube 510 closing the circuit between the conductive wire and connecting wire.

Although it may be desirable to achieve perfect orientation, orientation that is only near-perfect may still result in a high level of cross-polarization isolation. For antennas capable of producing a polarized radiation pattern in vertical or horizontal orientation, the cross-polarization isolation is proportional to the cosine of the angle between the undesired radiation polarization pattern and desired signal antenna. If the angle is 90 degrees, the isolation would be infinite. However, if the angle between is 78.5 degrees, the isolation drops to 14 dB.

In the described embodiment, achieving 14 dB of cross-polarization isolation between the local broadcast station transmitted signal and the WRAN transmitted signal would require the pendulum structure to allow no more than approximately 5-10 degrees of antenna orientation error.

Figure 6:
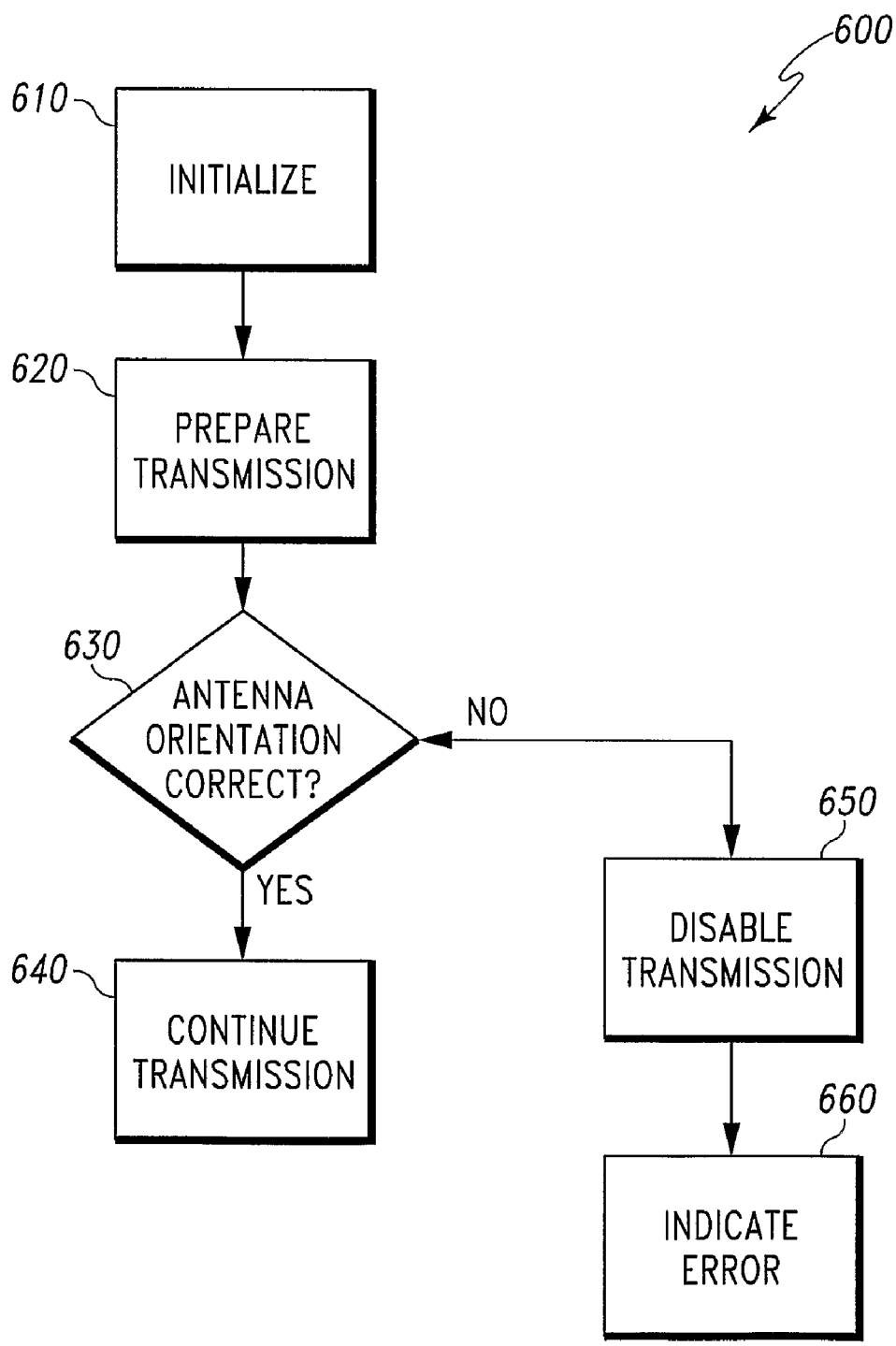
FIG. 6 is a flow chart illustrating an exemplary process for controlling transmission using an embodiment of the present invention.

Turning to FIG. 6, a flow chart illustrating an exemplary process 600 for controlling transmission using an embodiment of the present invention is shown. The process may be used for controlling the operation of a transmitter control circuit used with a transceiver operating in a WRAN. The flow chart contains steps indicating a complete process based on a particular embodiment of the method. One skilled in the art should appreciate that several of the steps may be omitted or exchanged in order to accommodate a different embodiment.

At step 610, initialization is performed. The initialization step 610 is performed in a device such as a CPE 240 and may include initial power up and/or software booting and may also include several self check operations. The initialization step 610 may further include receiving an initialization signal. The initialization signal received may be transmitted from a base station or from another CPE device acting as repeater, as described previously. The initialization signal may provide initial information regarding preliminary operation on the WRAN. In this manner, the initialization step 610 may be part or all of the initial "association" phase between a CPE and a base station described previously. Step 610, however, may not be necessary if the CPE device has already been active and communicating, for instance, with the WRAN.

Next, at step 620 a signal is prepared for transmission. Step 620 may include processing a data signal, modulating the data signal to produce an RF transmission signal in the modulator/transmitter 340 and supplying the RF transmission signal to the T/R switch 320.

Alternately, step 620 may include modulating a pre-formatted or test pattern signal stored in memory and supplying the modulated test pattern signal to the T/R switch 320. Next at step 630, the antenna orientation is determined with regard to, for example, proper radiation polarization. Step 630 may occur either during step 620 or may occur just before or during actual signal transmission. Step 630 may include monitoring the antenna transmitter control signal generated by antenna 310 and sent to either the T/R switch 310 or the controller 350.

If the determination in step 630 is positive then, at step 640, the signal prepared in step 620 is transmitted. The signal is transmitted and propagated or radiated from antenna 310 to either a base station or another CPE acting as a repeater. If the determination in step 630 is negative, then at step 650, normal transmission is disabled. The normal transmission may be disabled by switching the state of T/R switch 310 into a receive state and preventing it from changing states to a transmit state and radiating the signal. The disabling or preventing of normal transmission may alternately involve powering off or disabling the transmit circuitry in the modulator/transmitter 340. Further, step 650 may involve reducing the transmitted signal power by changing amplification in the modulator/transmitter 340.

Finally, at step 660, an indication of an error condition may be provided. The indication may include a prompt on a display screen or an indicator light to indicate that an error exists with the transmission capability of the CPE 240.

The steps in the process starting with either step 620 or step 630 may be resumed once the error condition has been addressed. Additionally, the steps starting with step 620 may be repeated each time the CPE 240 transmits signals within the WRAN.

Although the method described is conditioned for initial transmission or any time a transmission is made, it may also be possible to continuously monitor the operation of the device. As a result, the device may disable or alter transmission any time the antenna transmitter control indicates that an error, such as a misalignment, exists.

While the embodiments of the invention may be susceptible to various modifications and alternative forms, specific embodiments have been shown by way of example in the drawings and are described in detail herein. However, it should be understood that the invention is not intended to be limited to the particular forms disclosed. Rather, the disclosure is to cover all modifications, equivalents and alternatives falling within the spirit and scope of the disclosure as defined by the following appended claims.

What is claimed is:

1. An apparatus for controlling a signal comprising:
    a transmitter for transmitting a first signal;
    an antenna coupled to said transmitter for radiating said signal in a radiated polarization pattern, said antenna further being coupled to a receiver for receiving a second signal;
    a detector coupled to the antenna, the detector generating an antenna control signal based on an orientation of the antenna; and
    a controller coupled to the detector and the transmitter, the controller reducing a transmission signal power of the transmitter when said radiated first signal exhibits a polarization pattern that does not match a required polarization pattern for minimizing interference to the second signal from the first signal based on the antenna control signal and the second signal.

2. The apparatus as claimed in claim 1, wherein said detector is part of a radiating element of said antenna.

3. The apparatus as claimed in claim 1, wherein said detector is part of a mechanical support for said antenna.

4. The apparatus as claimed in claim 1, wherein said controller disables operation of said transmitter.

5. The apparatus as claimed in claim 1, wherein said controller reduces transmitter power of said transmitter.

6. The apparatus as claimed in claim 1, wherein said controller comprises a switch for alternately coupling said antenna to said transmitter and to said receiver.

7. The apparatus as claimed in claim 1, wherein said apparatus is included in a device for operation in a wireless data communications network.

8. The apparatus as claimed in claim 1, wherein said first signal is transmitted in a local wireless network and said second signal is received from a local broadcast station.

9. A method for processing a signal for transmission, comprising the steps of:
    producing a first signal for transmission;
    generating an antenna control signal based on an orientation of an antenna used for radiating said first signal, said antenna also used to receive a second signal;
    radiating said first signal in a polarization pattern; and
    reducing a transmission signal level of said first signal for transmission based on said antenna control signal and said second signal when said radiated first signal exhibits a polarization pattern that does not match a required polarization pattern for minimizing interference to the second signal from the first signal.

10. The method of claim 9, wherein said step of adjusting reducing further comprises preventing said signal from radiating.

11. The method of claim 9, further comprising the step of indicating an error condition exists when said radiated signal exhibits undesired polarization.

12. An apparatus comprising:
    a means for transmitting a first radio communications signal in a polarization orientation, said transmitting means also including means for receiving a second radio communications signal;
    a means for detecting said polarization orientation based on an orientation of said transmitting means; and
    a means for reducing a transmission signal power of said transmitting means if said polarization orientation does not match a required polarization orientation for minimizing interference to the second radio communications signal by the first radio communications signal based on the orientation of said transmitting means and the second radio communications signal.

13. The apparatus as claimed in claim 12, wherein said means for reducing a transmission signal power of said transmitting means further comprises a means for adjusting the signal level of said radio communications signal in said transmitting means.

14. The apparatus as claimed in claim 12, wherein said means for reducing a transmission signal power of said transmitting means further comprises a means for disabling said transmitting means.

* * * * *